US006173180B1

United States Patent
Hussain et al.

(10) Patent No.: US 6,173,180 B1
(45) Date of Patent: Jan. 9, 2001

(54) SYSTEM AND METHOD OF PROVIDING PREFERENTIAL ACCESS TO SUBSCRIBERS OF LOCALIZED SERVICE AREAS IN A RADIO TELECOMMUNICATIONS NETWORK

(75) Inventors: Tahir Hussain, Dallas; Ranjit Bhatia, Lewisville, both of TX (US)

(73) Assignee: Ericsson Inc., Richardson, TX (US)

( * ) Notice: Under 35 U.S.C. 154(b), the term of this patent shall be extended for 0 days.

(21) Appl. No.: 09/225,253

(22) Filed: Jan. 4, 1999

(51) Int. Cl.[7] ....................................................... H04Q 7/20
(52) U.S. Cl. ............................................. 455/433; 455/527
(58) Field of Search .................................... 455/426, 433, 455/435, 527, 560

(56) References Cited

U.S. PATENT DOCUMENTS

| | | | |
|---|---|---|---|
| 5,752,189 | * 5/1998 | Ueni et al. ............................ | 455/435 |
| 5,797,096 | * 8/1998 | Lupien et al. ........................ | 455/433 |
| 5,873,034 | * 2/1999 | Alperovich ........................... | 455/432 |
| 5,940,756 | * 8/1998 | Sibecas et al. ........................ | 455/426 |

* cited by examiner

Primary Examiner—Nguyen Vo
Assistant Examiner—N. Mehrpour
(74) Attorney, Agent, or Firm—Arthur I. Navarro

(57) ABSTRACT

A system and method of providing preferential access to a cellular telecommunications network to a localized service area (LSA) subscriber who subscribes to a LSA and is operating a mobile station (MS) within the LSA. The cells which are included in the LSA are defined in a base station controller (BSC). The LSA subscriber's subscription information in the home location register (HLR) identifies any LSAs to which the subscriber subscribes. A Preferential Priority Indicator (PPI) property may also be set for the MS in the HLR. The PPI property indicates that the MS is to be granted preferential access whenever the PPI property is set. A Preferential Priority Network Indicator (PPN) property is also set in the BSC that indicates that the BSC supports use of the PPI property whenever the PPN property is set. When the MS originates a call, the BSC derives a second LSA-ID from the Cell-ID for the cell where the call originated. The BSC then determines whether the first LSA-ID matches the second LSA-ID, and in one embodiment, provides preferential access to the MS if the LSA-IDs match. In a second embodiment, the system, also determines whether the PPI property is set and whether the PPN property is set. Preferential access is provided to the MS upon determining that the first LSA-ID matches the second LSA-ID, the PPI property is set, and the PPN property is set.

11 Claims, 3 Drawing Sheets

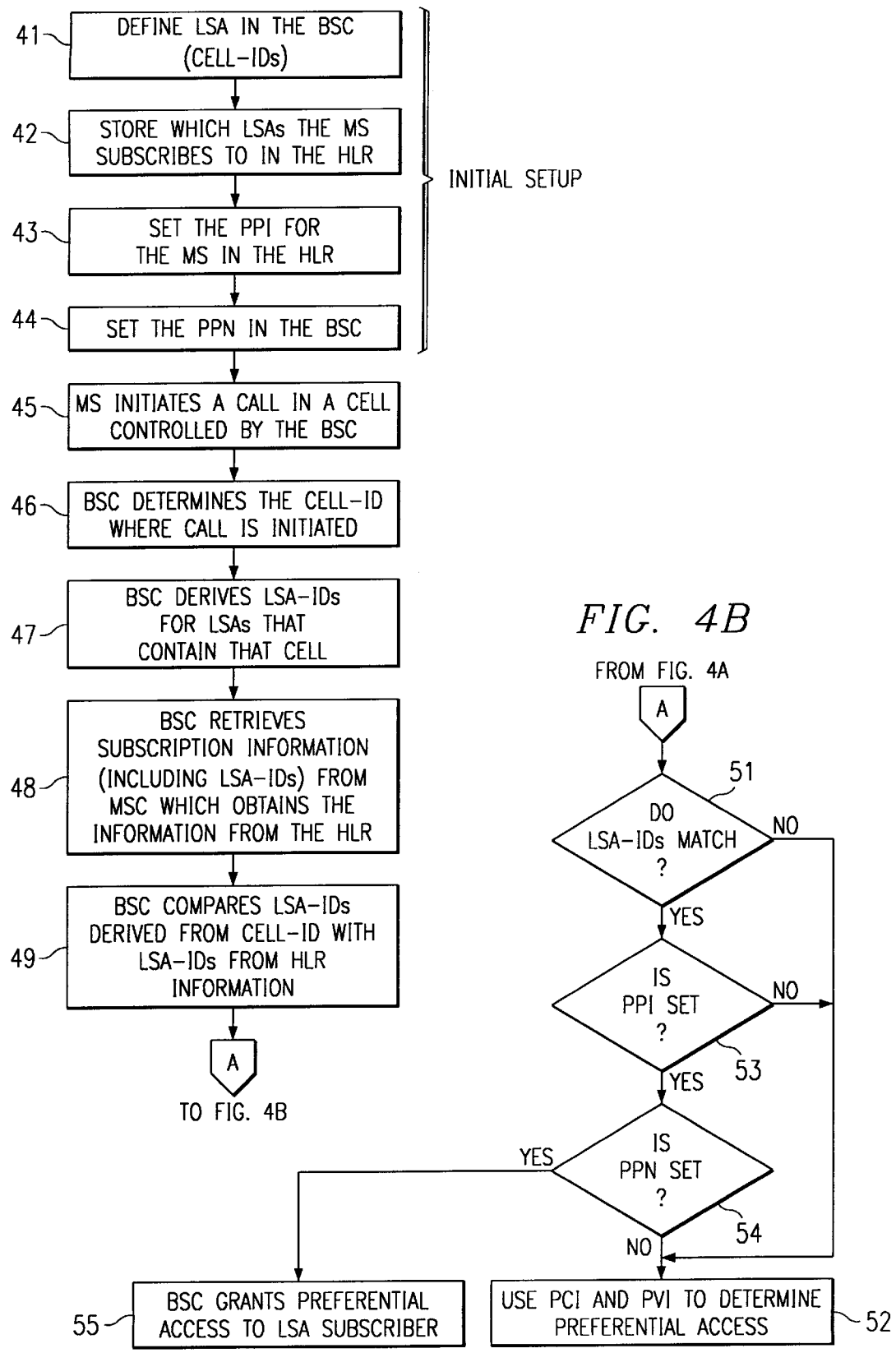

SYSTEM AND METHOD OF PROVIDING PREFERENTIAL ACCESS TO SUBSCRIBERS OF LOCALIZED SERVICE AREAS IN A RADIO TELECOMMUNICATIONS NETWORK

BACKGROUND OF THE INVENTION

1. Technical Field of the Invention

This invention relates to telecommunication systems and, more particularly, to a system and method of providing preferential access to subscribers of localized service areas (LSAs) in a radio telecommnunications network.

2. Description of Related Art

In the Global System for Mobile Communications (GSM), business indoor systems and home zones may be operated in cooperation with a local provider of cellular service. A Localized Service Area (LSA) may be defined for the business system or home zone, and may include one or more cells. Special tariffs or special sets of service features may be provided for certain subscribers within the LSA. The cells of the LSA may be contiguous or they may be distributed. For example, one cell may be in located in one city while one or more other cells in the LSA are located in another city. As long as a single LSA-ID is utilized to identify the LSA in the network, the LSA is treated as a single logical entity.

A proposed standard called Support of Localized Service Area (SoLSA) provides that the operator of LSA may offer several alternative types of restricted access to the LSA. Under "LSA-only" access, a LSA subscriber is allowed to access the Public Land Mobile Network (PLMN) within the subscriber's allowed LSA, but is not allowed to receive or originate calls outside the LSA. Non-LSA subscribers may receive or originate calls inside or outside the LSA, provided the LSA is not an exclusive access LSA. However, a problem arises if there is not sufficient capacity available in the LSA to support both LSA subscribers and non-LSA subscribers requesting access through the LSA. In this case, non-LSA subscribers may preempt LSA subscribers who are then unable to access the network.

Under "exclusive" access, cells in the LSA are for the exclusive use of LSA subscribers. Thus, LSA subscribers may access the PLMN either inside or outside the LSA, but non-LSA subscribers are not allowed to utilize cells within the LSA. This technique, however, may result in inefficient utilization of network resources, and loss of potential revenue to the operator, if an insufficient number of LSA subscribers utilize the LSA cells.

Finally, under "preferential" access, both LSA subscribers and non-LSA subscribers may access the PLMN through the LSA, but some resources in the LSA cells are reserved to provide preferential access for LSA subscribers. Non-LSA subscribers must compete for the remaining limited resources within the LSA. For example, a bank of channels may be reserved for the exclusive use of LSA subscribers. However, this technique may also result in inefficient utilization of network resources, and loss of potential revenue to the operator, when reserved channels go unused while there is demand from non-LSA subscribers.

The problem is further complicated in the GSM system since prioritization techniques are already in place to give certain subscribers priority for system access. For example, subscribers who are capable of preempting other subscribers are assigned a property in their home location register (HLR) called a Preemption Capability Indicator (PCI). Conversely, subscribers who are vulnerable to preemption are assigned a property in the HLR called a Preemption Vulnerability Indicator (PVI). Subscribers who do not have either one of these indicators set in the HLR fall in between in the prioritization scheme. Thus, a subscriber who does not have either indicator set may be,preempted by a subscriber with PCI, but may still preempt a subscriber with PVI set.

In the context of a LSA, a problem arises in granting access to the LSA when a non-LSA subscriber enters the LSA with PCI set. Under existing standards, this non-LSA subscriber can then preempt LSA subscribers who do not have PCI set, even in their own LSA. Thus, LSA subscribers may lose their preferential treatment.

It would be advantageous to have a system and method of providing preferential access to subscribers of LSAs that efficiently utilizes the resources of the network, is compatible with the SoLSA standard, and overcomes the problem presented by other prioritization techniques in the GSM system. The present invention provides such a system and method.

SUMMARY OF THE INVENTION

In one aspect, the present invention is a system for providing access to a cellular telecommunications network to a localized service area (LSA) subscriber who subscribes to a LSA and is operating a mobile station within the LSA. The system comprises a home location register that stores a first identification (first LSA-ID) for the LSA to which the LSA subscriber subscribes, and a base station controller which interfaces through a mobile switching center to the home location register and the network. The base station controller includes means for deriving a second LSA-ID from a Cell-ID for a cell in which a call is originated by the mobile station. The base station controller also includes means for retrieving the first LSA-ID from the home location register, means for determining whether the first LSA-ID matches the second LSA-ID, and means for providing the mobile station with access to the network upon determining that the first LSA-ID matches the second LSA-ID.

In another aspect, the present invention is a method of providing preferential access to a cellular telecommunications network to a localized service area (LSA) subscriber who subscribes to a LSA and is operating a mobile station within the LSA. The method includes the steps of defining in a base station controller those cells in the network that are included in the LSA, and storing in a home location register subscription information that includes a first identification (first LSA-ID) for the LSA to which the LSA subscriber subscribes. A Preferential Priority Indicator (PPI) property for the mobile station is set in the home location register. The PPI property indicates that the mobile station is to be granted preferential access whenever the PPI property is set. A Preferential Priority Network Indicator (PPN) property is also set in the base station controller, and indicates that the base station controller supports use of the PPI property whenever the PPN property is set. The base station controller then derives a second LSA-ID from a Cell-ID for a cell in which a call is originated by the mobile station. This is followed by determining whether the first LSA-ID matches the second LSA-ID, determining whether the PPI property is set, and determining whether the PPN property is set. The method then provides the mobile station with preferential access to the network upon determining that the first LSA-ID matches the second LSA-ID, the PPI property is set, and the PPN property is set.

In yet another aspect, the present invention is a method of providing preferential access to a cellular telecommunications network to a localized service area (LSA) subscriber who subscribes to a LSA and is operating a mobile station within the LSA. The network includes a home location register and a base station controller, and the method includes the steps of setting in the home location register, a Preferential Priority Indicator (PPI) property for the mobile station that indicates that the mobile station is to be granted preferential access whenever the PPI property is set, and setting in the base station controller, a Preferential Priority Network Indicator (PPN) property that indicates that the base station controller supports use of the PPI property whenever the PPN property is set. The method then determines whether the PPI property is set in the home location register, and determines whether the PPN property is set in the base station controller, upon determining that the PPI property is set in the home location register. Finally, the method provides the mobile station with preferential access to the network upon determining that the PPI property is set in the home location register, and the PPN property is set in the base station controller.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 4A and 4B are a flow chart of a second embodiment of the method of the present invention utilizing the network of FIG. 3.

DETAILED DESCRIPTION OF EMBODIMENTS

Figure 1:
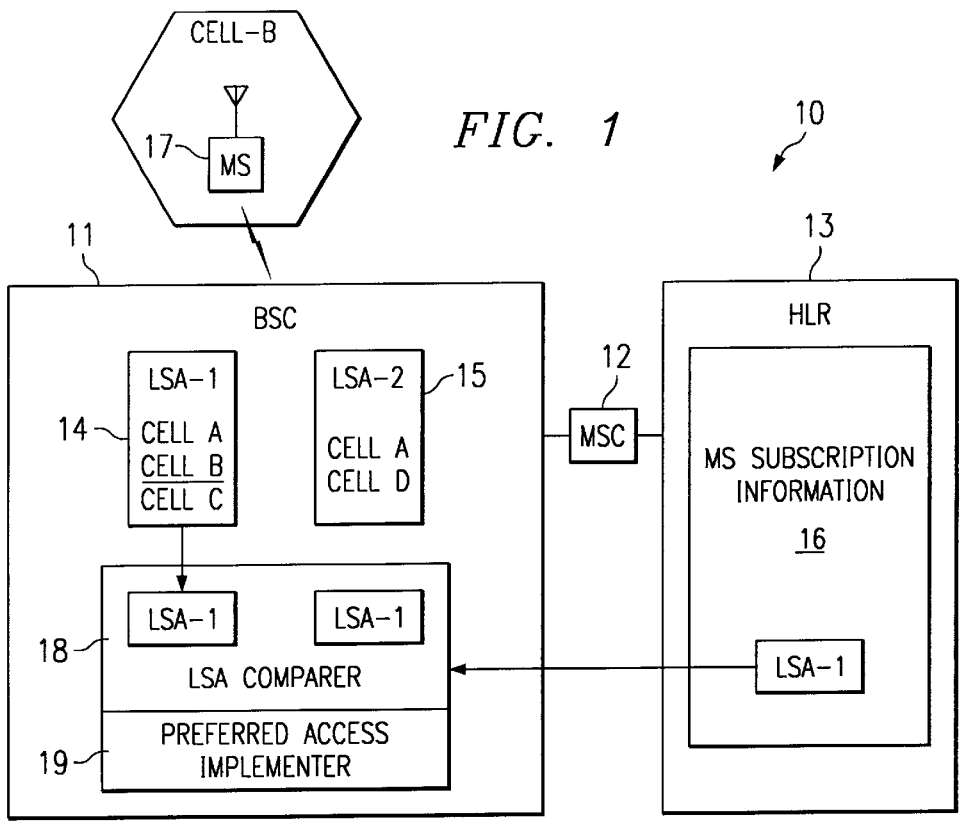
FIG. 1 is a simplified block diagram of a radio telecommunications network in which a first embodiment of the system of the present invention has been implemented.

The present invention is a system and method of providing preferential treatment to LSA subscribers. FIG. 1 is a simplified block diagram of a radio telecommunications network 10 in which a first embodiment of the system of the present invention has been implemented. The network includes a base station controller (BSC) 11, a mobile switching center (MSC) 12, and a home location register (HLR) 13. The BSC stores LSA-IDs and the Cell-IDs of the cells that are included in each LSA such as LSA-1 14 and LSA-2 15. The HLR stores subscription information 16 for MSs in the network such as MS 17 which is operating in Cell B. The subscription information includes LSA-IDs for each LSA to which the MS subscribes. The BSC also includes a LSA comparer 18 and a preferred access implementer 19.

When the MS 17 initiates a call, the BSC 11 recognizes that the call originates in Cell B. From the BSC's memory 14, it is then determined that Cell B is in LSA-1. The BSC retrieves the MS's subscription information from the MSC 12 which obtains the information from the HLR 13. The subscription information includes LSA-IDs for any LSA's to which the MS subscribes. The LSA-ID retrieved from the HLR is then compared with the LSA-ID derived from the Cell ID in the LSA comparer 18. If the LSA-IDs match, then the BSC grants preferred access to the MS. The preferred access is implemented by the preferred access implementer which may preempt other connections to provide a channel to the MS.

Figure 2:
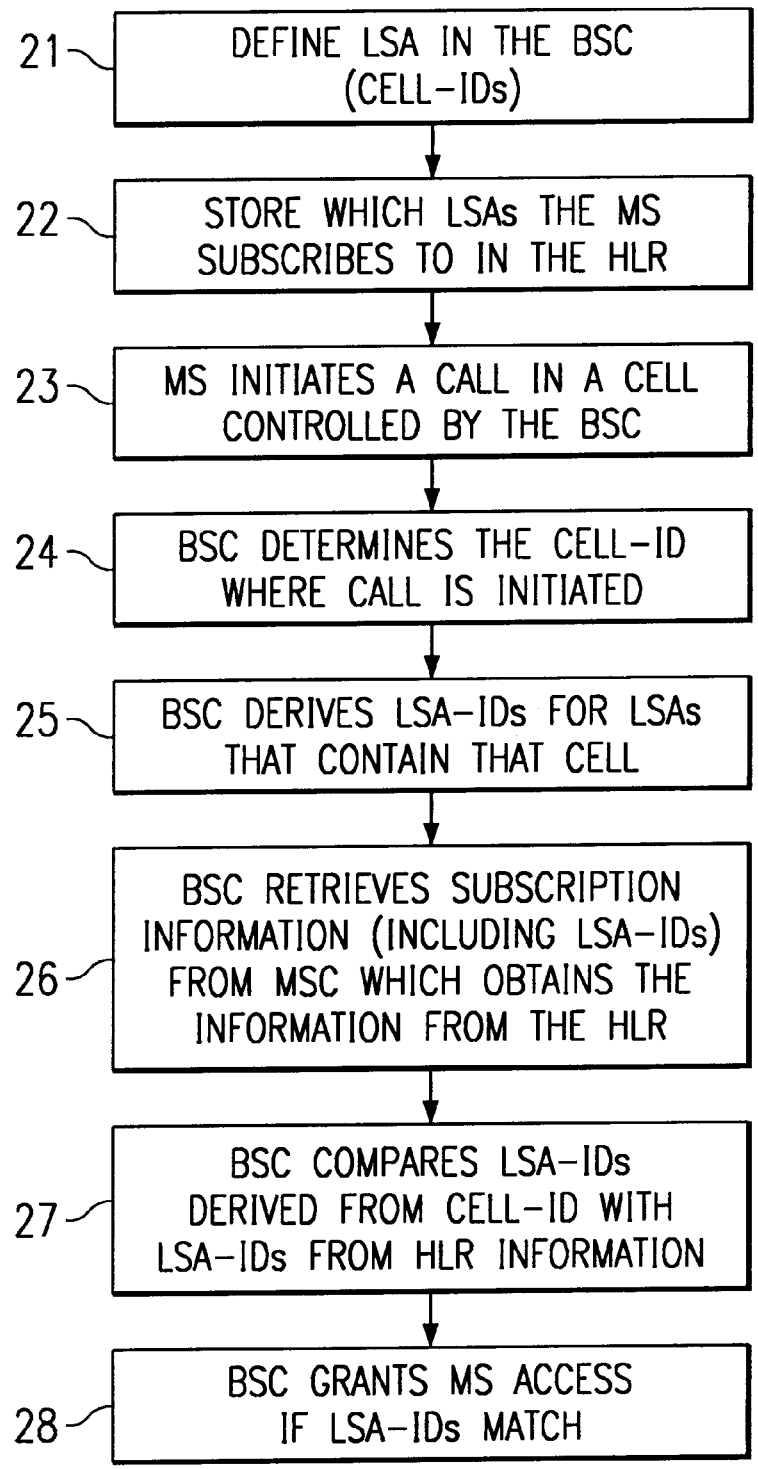
FIG. 2 is a flow chart of a first embodiment of the method of the present invention utilizing the network of FIG. 1.

FIG. 2 is a flow chart of a first embodiment of the method of the present invention. At step 21, the cells (Cell-IDs) of the LSA are defined in the BSC 11. For example, if LSA-1 has three cells, they may be defined as Cell A, Cell B, and Cell C. LSA-2 may include Cell A and Cell D. At step 22, the LSAs to which the MS subscribes are stored in the HLR 13. At 23, the MS initiates a call in a cell controlled by the BSC such as Cell B. The BSC knows that the call originates in Cell B and determines its Cell-ID at 24. At step 25, since the Cell-IDs for each LSA are defined in the BSC, the BSC derives the LSA-IDs for LSAs that contain Cell B. At 26, the BSC retrieves the MS's subscription information from the MSC 12 which obtains the information from the HLR 13. The subscription information includes LSA-IDs for any LSA's to which the MS subscribes. Then, at 27, the LSA comparer 18 in the BSC compares the LSA-IDs which it derived from the originating Cell-ID, with LSA-IDs obtained from the HLR information. If there is a match of LSA-IDs, the BSC grants the MS access to the network at 28.

Figure 3:
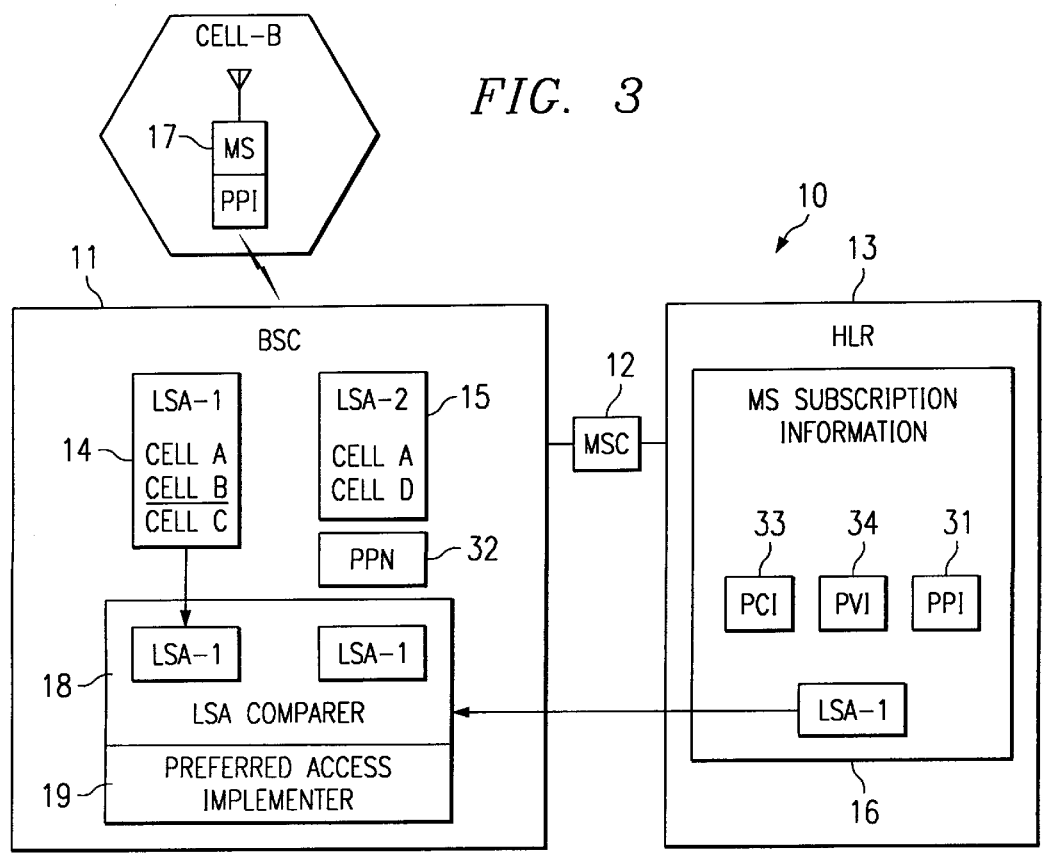
FIG. 3 is a simplified block diagram of a radio telecommunications network in which a second embodiment of the system of the present invention has been implemented.

FIG. 3 is a simplified block diagram of a radio telecommunications network in which a second embodiment of the system of the present invention has been implemented. In this embodiment, a property known as a Preferential Priority Indicator (PPI) 31 is set in the HLR 13 for each LSA subscriber. When the PPI property is set, it prevents preemption by non-LSA subscribers having PCI set who may come into the LSA. The BSC 11 also has a property which is known as a Preferential Priority Network Indicator (PPN) 32. The PPN indicates whether the network (BSC) supports the use of the PPI property.

FIGS. 4A and 4B are a flow chart of a second embodiment of the method of the present invention utilizing the network of FIG. 3. At step 41, the cells (Cell-IDs) of the LSA are defined in the BSC 11. At step 42, the LSAs to which the MS subscribes are stored in the HLR 13. At 43, the PPI property 31 is set in the HLR for the LSA subscriber, and the PPN property is set in the BSC at 44 indicating that the BSC supports the use of the PPI property. It is only required that the PPN be set once since it is a network level property. The PPN does not have to be set for each subscriber. At step 45, the MS initiates a call in a cell controlled by the BSC such as Cell B. The BSC knows that the call originates in Cell B and determines its Cell-ID at 46. At step 47, since the Cell-IDs for each LSA are defined in the BSC, the BSC derives the LSA-IDs for LSAs that contain Cell B. At 48, the BSC retrieves subscription information from the HLR regarding which LSAs the MS subscribes to, and the status of the MS's PPI, PCI, and PVI properties. Then, at 49, the LSA comparer 18 in the BSC compares the LSA-IDs which it derived from the originating Cell-ID, with LSA-IDs obtained from the HLR information. The method then moves to FIG. 4B.

At FIG. 4B, step 51, it is determined in the BSC whether or not the LSA-IDs match. If the LSA-IDs do not match, then the MS is not in a LSA to which it subscribes. Therefore, the method moves to step 52 where preferential access is determined on the basis of the PCI and PVI properties set the MS 17 in the HLR. However, if the LSA-IDs match at 51, the method moves to step 53 where it is determined whether or not the PPI property 31 is set for the MS 17. If the PPI property is not set, then the method moves to step 52 where preferential access is determined on the basis of the PCI property 33 and PVI property 34 set for the MS in the HLR. However, if the PPI property is set, then the method moves to step 54 where it is determined whether or not the PPN property 32 is set in the BSC 11. If the PPN property is not set, then the BSC does not support the use of the PPI property, and the method moves to step 52 where preferential access is determined on the basis of the PCI and PVI properties set for the MS in the HLR. However, if the PPN property is set, then the method moves to step 55 where the BSC grants preferential access to the MS 17.

Table 1 below indicates in tabular form the conditions under which the present invention grants preferential access to a LSA subscriber when a non-LSA subscriber enters the LSA and has its PCI property or its PVI property set in the HLR. In general, if the PPN property for the BSC and the PPI property for the LSA mobile station are both set, then the LSA subscriber is given preferential access, regardless of the PCI or PVI settings of the non-LSA subscriber. If either the PPN property or the PPI property is not set, then the LSA subscriber is not given preferential access.

TABLE 1

| PPN (Network) | PPI (LSA Subscriber) | PCI (Non-LSA Subscriber) | PVI (Non-LSA Subscriber) | Preferential Access |
|---|---|---|---|---|
| Set | Set | Set | Set | Yes |
| Off | Set | Set | Set | No |
| Off | Off | Set | Set | No |
| Set | Set | Set | Off | Yes |
| Set | Set | Off | Set | Yes |
| Set | Off | Set | Set | No |

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for providing access to a cellular telecommunications network to a localized service area (LSA) subscriber who subscribes to a LSA and is operating a mobile station within the LSA, said system comprising:
   a home location register that stores a first identification (first LSA-ID) for the LSA to which the LSA subscriber subscribes; and
   a base station controller which interfaces through a mobile switching center to the home location register, the base station controller including:
      means for deriving a second LSA-ID from a cell identification (Cell-ID) for a cell in which a call is originated by the mobile station;
      means for retrieving the first LSA-ID from the home location register;
      means for determining whether the first LSA-ID matches the second LSA-ID; and
      means for providing the mobile station with access to the network upon determining that the first LSA-ID matches the second LSA-ID.

2. The system for providing access of claim 1 wherein the means for deriving a second LSA-ID from a Cell-ID for a cell in which a call is originated by the mobile station includes:
   means for determining the Cell-ID for the cell in which the call is originated by the mobile station; and
   a database which identifies which cells are in each LSA in the base station controller's service area.

3. A method of providing access to a cellular telecommunications network to a localized service area (LSA) subscriber who subscribes to a LSA and is operating a mobile station with the LSA, said method comprising the steps of:
   defining in a base station controller, which cells in the network are included in the LSA;
   storing in a home location register, a first identification (first LSA-ID) for the LSA to which the LSA subscriber subscribes;
   deriving in the base station controller, a second LSA-ID from a cell identification (Cell-ID) for a cell in which a call is originated by the mobile station;
   determining whether the first LSA-ID matches the second LSA-ID; and
   providing the mobile station with access to the network upon determining that the first LSA-ID matches the second LSA-ID.

4. The method of providing access of claim 3 wherein the step of deriving a second LSA-ID includes the steps of:
   determining the Cell-ID for the cell in which the call is originated by the mobile station; and
   identifying which cells are in each LSA in the base station controller's service area from a database in the base station controller.

5. A system for providing preferential access to a cellular telecommnunications network to a localized service area (LSA) subscriber who subscribes to a LSA and is operating a mobile station within the LSA, said system comprising:
   a home location register that stores subscription information for the LSA subscriber, the subscription information including:
      a first identification (first LSA-ID) for the LSA to which the LSA subscriber subscribes; and
      a Preferential Priority Indicator (PPI) property for the mobile station that indicates that the mobile station is to be granted preferential access whenever the PPI property is set;
   a base station controller which interfaces through a mobile switching center to the home location register, the base station controller including:
      means for deriving a second LSA-ID from a cell identification for a cell in which a call is originated by the mobile station;
      means for retrieving the first LSA-ID from the home location register;
      means for determining whether the first LSA-ID matches the second LSA-ID;
      a Preferential Priority Network Indicator (PPN) property that indicates that the base station controller supports use of the PPI property whenever the PPN property is set; and
      means for providing preferential access to the mobile station upon determining that the first LSA-ID matches the second LSA-ID, the PPI property is set, and the PPN property is set.

6. The system for providing preferential access of claim 5 wherein the home location register also stores a Preemption Capability Indicator (PCI) property for mobile stations that are capable of preempting other mobile stations, and a Preemption Vulnerability Indicator (PVI) property for mobile stations that are vulnerable to preemption.

7. The system for providing preferential access of claim 6 further comprising means for determining preferential access based upon the PCI property and the PVI property of the mobile station whenever the first LSA-ID does not match the second LSA-ID, the PPI property is not set, or the PPN property is not set.

8. A method of providing preferential access to a cellular telecommunications network to a localized service area (LSA) subscriber who subscribes to a LSA and is operating a mobile station within the LSA, said method comprising the steps of:

defining in a base station controller, which cells in the network are included in the LSA;

storing in a home location register, subscription information that includes a first identification (first LSA-ID) for the LSA to which the LSA subscriber subscribes;

setting in the home location register, a Preferential Priority Indicator (PPI) property for the mobile station that indicates that the mobile station is to be granted preferential access whenever the PPI property is set;

setting in the base station controller, a Preferential Priority Network Indicator (PPN) property that indicates that the base station controller supports use of the PPI property whenever the PPN property is set;

deriving in the base station controller, a second LSA-ID from a cell identification for a cell in which a call is originated by the mobile station;

determining whether the first LSA-ID matches the second LSA-ID;

determining whether the PPI property is set, upon determining that the first LSA-ID matches the second LSA-ID;

determining whether the PPN property is set, upon determining that the PPI property is set; and providing preferential access to the mobile station upon determining that the first LSA-ID matches the second LSA-ID, the PPI property is set, and the PPN property is set.

9. The method of providing preferential access of claim 8 wherein the step of storing subscription information in the HLR includes the steps of:

storing a Preemption Capability Indicator (PCI) property for mobile stations that are capable of preempting other mobile stations; and storing a Preemption Vulnerability Indicator (PVI) property for mobile stations that are vulnerable to preemption.

10. The method of providing preferential access of claim 9 further comprising determining preferential access based upon the PCI property and the PVI property of the mobile station whenever the first LSA-ID does not match the second LSA-ID, the PPI property is not set, or the PPN property is not set.

11. A method of providing preferential access to a cellular telecommunications network to a localized service area (LSA) subscriber who subscribes to a LSA and is operating a mobile station within the LSA, the network including a home location register and a base station controller, said method comprising the steps of:

setting in the home location register, a Preferential Priority Indicator (PPI) property for the mobile station that indicates that the mobile station is to be granted preferential access whenever the PPI property is set;

setting in the base station controller, a Preferential Priority Network Indicator (PPN) property that indicates that the base station controller supports use of the PPI property whenever the PPN property is set;

determining whether the PPI property is set in the home location register;

determining whether the PPN property is set in the base station controller, upon determining that the PPI property is set in the home location register; and providing preferential access to the mobile station upon determining that the PPI property is set in the home location register, and the PPN property is set in the base station controller.

* * * * *